(12) United States Patent
Selman et al.

(10) Patent No.: US 7,451,163 B2
(45) Date of Patent: Nov. 11, 2008

(54) DATA SYNCHRONIZATION

(75) Inventors: Daniel Selman, Stodmarsh (GB);
Robert Bergman, Denver, CO (US);
Edward K. O'Neil, Boulder, CO (US)

(73) Assignee: BEA Systems, Inc., San Jose, CA (US)

( * ) Notice: Subject to any disclaimer, the term of this patent is extended or adjusted under 35 U.S.C. 154(b) by 232 days.

(21) Appl. No.: 10/279,450

(22) Filed: Oct. 24, 2002

(65) Prior Publication Data

US 2003/0110172 A1   Jun. 12, 2003

Related U.S. Application Data (60) Provisional application No. 60/386,487, filed on Oct. 24, 2001.

(51) Int. Cl.
*G06F 17/30* (2006.01)
*G06F 7/00* (2006.01)
*G06F 15/16* (2006.01)

(52) U.S. Cl. .............. 707/200; 707/1; 707/3; 707/10; 707/203; 709/201; 709/203

(58) Field of Classification Search .......... 707/10, 707/201, 204, 200, 203, 1, 3; 709/201, 203
See application file for complete search history.

(56) References Cited

U.S. PATENT DOCUMENTS

| | | | |
|---|---|---|---|
| 5,173,939 A | 12/1992 | Abadi et al. | |
| 5,237,614 A | 8/1993 | Weiss | |
| 5,347,653 A | 9/1994 | Flynn et al. | |
| 5,355,474 A | 10/1994 | Thuraisingham et al. | |
| 5,369,702 A | 11/1994 | Shanton | 380/4 |
| 5,426,747 A | 6/1995 | Weinreb et al. | |
| 5,481,700 A | 1/1996 | Thuraisingham | |
| 5,544,322 A | 8/1996 | Cheng et al. | |

(Continued)

FOREIGN PATENT DOCUMENTS

EP   1 256 889   11/2002

(Continued)

OTHER PUBLICATIONS

Eiji Okamoto, "Proposal for Integrated Security Systems"; Jun. 1992, IEEE Computer Society Press; pp. 354-358.

(Continued)

*Primary Examiner*—Don Wong
*Assistant Examiner*—Thanh-Ha Dang
(74) *Attorney, Agent, or Firm*—Fliesler Meyer LLP (57) ABSTRACT

Application data used by enterprise applications running on one or more servers can be synchronized with application data deployed from other locations. Application data can be transmitted as XML files over HTTP to facilitate synchronization with web-enabled servers. Multiple service data repositories can be synchronized with application data residing in a master data repository that runs within an enterprise application. Server-to-server data synchronization functionality is also provided through the use of proxy data repositories. Application data files can be deployed from an author system to remote servers. Newly-authored application data files can be versioned in the author system using a source control system and selectively deployed to various servers by the author in conjunction with a multi-stage testing process in preparation for deployment of the application data to a production server.

13 Claims, 6 Drawing Sheets

U.S. PATENT DOCUMENTS

| | | |
|---|---|---|
| 5,557,747 A | 9/1996 | Rogers et al. |
| 5,627,886 A | 5/1997 | Bowman |
| 5,649,195 A | 7/1997 | Scott et al. ................. 395/617 |
| 5,757,669 A * | 5/1998 | Christie et al. .............. 709/205 |
| 5,758,355 A | 5/1998 | Buchanan ................... 707/201 |
| 5,797,128 A | 8/1998 | Birnbaum |
| 5,825,883 A | 10/1998 | Archibald et al. |
| 5,826,000 A | 10/1998 | Hamilton |
| 5,826,268 A | 10/1998 | Schaefer et al. |
| 5,838,909 A | 11/1998 | Roy et al. .............. 395/200.39 |
| 5,848,396 A | 12/1998 | Gerace ........................ 705/10 |
| 5,867,667 A | 2/1999 | Butman et al. |
| 5,889,953 A | 3/1999 | Thebaut et al. |
| 5,918,210 A | 6/1999 | Rosenthal et al. |
| 5,925,126 A | 7/1999 | Hsieh |
| 5,950,195 A | 9/1999 | Stockwell et al. |
| 5,954,798 A * | 9/1999 | Shelton et al. .............. 709/224 |
| 5,956,400 A | 9/1999 | Chaum et al. |
| 5,956,719 A | 9/1999 | Kudo et al. ................... 707/10 |
| 5,966,707 A | 10/1999 | Van Huben et al. |
| 5,987,469 A | 11/1999 | Lewis et al. |
| 5,987,611 A | 11/1999 | Freund |
| 5,991,735 A | 11/1999 | Gerace ........................ 705/10 |
| 5,991,877 A | 11/1999 | Luckenbaugh |
| 6,005,571 A | 12/1999 | Pachauri |
| 6,006,194 A | 12/1999 | Merel |
| 6,006,265 A | 12/1999 | Rangan et al. .............. 709/226 |
| 6,009,410 A | 12/1999 | LeMole et al. ................ 705/14 |
| 6,026,433 A | 2/2000 | D'Arlach et al. ............ 709/217 |
| 6,029,144 A | 2/2000 | Barrett et al. |
| 6,029,182 A | 2/2000 | Nehab et al. ................. 707/523 |
| 6,054,910 A * | 4/2000 | Tada et al. ................... 333/206 |
| 6,055,515 A | 4/2000 | Consentino et al. |
| 6,055,637 A | 4/2000 | Hudson et al. ............... 713/201 |
| 6,058,392 A | 5/2000 | Sampson et al. ............... 707/6 |
| 6,081,829 A | 6/2000 | Sidana ........................ 709/203 |
| 6,083,276 A | 7/2000 | Davidson et al. |
| 6,092,083 A | 7/2000 | Brodersen et al. ........... 707/201 |
| 6,098,173 A | 8/2000 | Elgressy et al. |
| 6,105,027 A | 8/2000 | Schneider et al. .............. 707/9 |
| 6,108,687 A * | 8/2000 | Craig ........................ 709/203 |
| 6,112,192 A | 8/2000 | Capek ........................ 705/59 |
| 6,128,663 A | 10/2000 | Thomas ...................... 709/228 |
| 6,133,915 A | 10/2000 | Arcuri et al. ................. 345/334 |
| 6,141,010 A | 10/2000 | Hoyle ........................ 345/356 |
| 6,141,686 A | 10/2000 | Jackowski et al. |
| 6,148,333 A | 11/2000 | Guedalia et al. |
| 6,154,844 A | 11/2000 | Touboul et al. |
| 6,157,924 A | 12/2000 | Austin ........................ 707/10 |
| 6,161,139 A | 12/2000 | Win et al. ................... 709/225 |
| 6,167,407 A | 12/2000 | Nachenberg et al. |
| 6,167,445 A | 12/2000 | Gai et al. |
| 6,167,448 A | 12/2000 | Hemphill et al. ............. 709/224 |
| 6,169,794 B1 | 1/2001 | Oshimi et al. ............... 379/207 |
| 6,170,009 B1 | 1/2001 | Mandal et al. |
| 6,178,172 B1 | 1/2001 | Rochberger ................. 370/395 |
| 6,182,142 B1 | 1/2001 | Win et al. ................... 709/229 |
| 6,182,226 B1 | 1/2001 | Reid et al. ................... 713/201 |
| 6,182,277 B1 | 1/2001 | DeGroot et al. |
| 6,188,399 B1 | 2/2001 | Voas et al. ................... 345/334 |
| 6,195,696 B1 | 2/2001 | Baber et al. ................. 709/223 |
| 6,202,066 B1 | 3/2001 | Barkley et al. ................. 707/9 |
| 6,202,157 B1 | 3/2001 | Brownlie et al. |
| 6,202,207 B1 | 3/2001 | Donohue |
| 6,205,466 B1 | 3/2001 | Karp et al. ................... 709/104 |
| 6,209,101 B1 | 3/2001 | Mitchem et al. |
| 6,216,231 B1 | 4/2001 | Stubblebine |
| 6,226,745 B1 | 5/2001 | Wiederhold ................. 713/200 |
| 6,233,576 B1 | 5/2001 | Lewis ........................... 707/9 |
| 6,236,991 B1 | 5/2001 | Frauenhofer et al. ........... 707/6 |
| 6,241,608 B1 | 6/2001 | Torango ...................... 463/27 |
| 6,253,321 B1 | 6/2001 | Nikander et al. |
| 6,260,050 B1 | 7/2001 | Yost et al. ................... 707/501 |
| 6,269,393 B1 | 7/2001 | Yost et al. ................... 709/201 |
| 6,269,456 B1 | 7/2001 | Hodges et al. |
| 6,275,941 B1 | 8/2001 | Saito et al. |
| 6,285,366 B1 | 9/2001 | Ng et al. |
| 6,285,983 B1 | 9/2001 | Jenkins ........................ 705/10 |
| 6,285,985 B1 | 9/2001 | Horstmann ................... 705/14 |
| 6,295,607 B1 | 9/2001 | Johnson |
| 6,301,613 B1 | 10/2001 | Ahlstrom et al. |
| 6,304,881 B1 * | 10/2001 | Halim et al. ................. 707/201 |
| 6,308,163 B1 | 10/2001 | Du et al. ......................... 705/8 |
| 6,317,868 B1 | 11/2001 | Grimm et al. |
| 6,327,594 B1 | 12/2001 | Van Huben et al. |
| 6,327,618 B1 | 12/2001 | Ahlstrom et al. |
| 6,327,628 B1 | 12/2001 | Anuff et al. ................. 709/311 |
| 6,336,073 B1 | 1/2002 | Ihara et al. ................... 701/202 |
| 6,339,423 B1 | 1/2002 | Sampson et al. |
| 6,341,352 B1 | 1/2002 | Child et al. |
| 6,353,886 B1 | 3/2002 | Howard et al. |
| 6,360,363 B1 | 3/2002 | Moser et al. |
| 6,393,474 B1 | 5/2002 | Eichert et al. |
| 6,397,222 B1 | 5/2002 | Zellweger |
| 6,412,077 B1 | 6/2002 | Roden et al. |
| 6,418,448 B1 | 7/2002 | Sarkar |
| 6,430,556 B1 | 8/2002 | Goldberg |
| 6,438,563 B1 | 8/2002 | Kawagoe ..................... 707/201 |
| 6,449,638 B1 | 9/2002 | Wecker et al. .............. 709/217 |
| 6,457,007 B1 | 9/2002 | Kikuchi et al. |
| 6,460,084 B1 | 10/2002 | Van Horne et al. .......... 709/227 |
| 6,460,141 B1 | 10/2002 | Olden ........................ 713/201 |
| 6,463,440 B1 | 10/2002 | Hind et al. ................... 707/102 |
| 6,466,239 B2 | 10/2002 | Ishikawa |
| 6,473,791 B1 | 10/2002 | Al-Ghosein et al. |
| 6,477,543 B1 * | 11/2002 | Huang et al. ................. 707/200 |
| 6,477,575 B1 | 11/2002 | Koeppel et al. |
| 6,484,177 B1 | 11/2002 | Van Huben et al. |
| 6,484,261 B1 | 11/2002 | Wiegel |
| 6,487,594 B1 | 11/2002 | Bahlmann |
| 6,519,647 B1 | 2/2003 | Howard et al. |
| 6,530,024 B1 | 3/2003 | Proctor |
| 6,539,375 B2 | 3/2003 | Kawasaki ....................... 707/5 |
| 6,571,247 B1 | 5/2003 | Danno et al. ................. 707/100 |
| 6,581,071 B1 | 6/2003 | Gustman et al. |
| 6,584,454 B1 | 6/2003 | Hummel et al. |
| 6,587,849 B1 | 7/2003 | Mason et al. ................... 707/5 |
| 6,587,876 B1 | 7/2003 | Mahon et al. |
| 6,615,218 B2 | 9/2003 | Mandal et al. |
| 6,618,806 B1 | 9/2003 | Brown et al. |
| 6,633,538 B1 * | 10/2003 | Tanaka et al. ................ 370/222 |
| 6,654,747 B1 | 11/2003 | Van Huben et al. |
| 6,665,677 B1 | 12/2003 | Wotring et al. |
| 6,668,354 B1 | 12/2003 | Chen et al. |
| 6,684,369 B1 | 1/2004 | Bernardo et al. |
| 6,697,805 B1 * | 2/2004 | Choquier et al. .............. 707/10 |
| 6,721,888 B1 | 4/2004 | Liu et al. |
| 6,732,144 B1 * | 5/2004 | Kizu et al. ................... 709/203 |
| 6,735,586 B2 | 5/2004 | Timmons |
| 6,735,701 B1 | 5/2004 | Jacobson |
| 6,738,789 B2 * | 5/2004 | Multer et al. ................. 707/201 |
| 6,751,659 B1 | 6/2004 | Fenger et al. |
| 6,754,672 B1 | 6/2004 | McLauchlin ................. 707/104 |
| 6,757,698 B2 * | 6/2004 | McBride et al. .............. 707/204 |
| 6,769,095 B1 | 7/2004 | Brassard et al. |
| 6,769,118 B2 | 7/2004 | Garrison et al. |
| 6,779,002 B1 * | 8/2004 | Mwaura ...................... 707/203 |
| 6,785,721 B1 * | 8/2004 | Immerman et al. .......... 709/220 |
| 6,789,202 B1 | 9/2004 | Ko et al. |
| 6,834,284 B2 | 12/2004 | Acker et al. |
| 6,856,999 B2 * | 2/2005 | Flanagin et al. .......... 707/103 Y |
| 6,857,012 B2 | 2/2005 | Sim et al. |
| 6,865,549 B1 | 3/2005 | Connor |
| 6,880,005 B1 | 4/2005 | Bell et al. |

| | | | |
|---|---|---|---|
| 6,904,454 B2 | 6/2005 | Stickler | |
| 6,920,457 B2 | 7/2005 | Pressmar | |
| 6,922,695 B2* | 7/2005 | Skufca et al. | 707/10 |
| 6,934,934 B1* | 8/2005 | Osborne et al. | 717/126 |
| 6,957,261 B2 | 10/2005 | Lortz | |
| 6,961,897 B1 | 11/2005 | Peel et al. | |
| 6,965,999 B2 | 11/2005 | Fox et al. | |
| 6,970,876 B2 | 11/2005 | Hotti et al. | |
| 6,978,379 B1 | 12/2005 | Goh et al. | |
| 6,985,915 B2* | 1/2006 | Somalwar et al. | 707/203 |
| 7,003,578 B2 | 2/2006 | Kanada et al. | |
| 7,035,879 B2* | 4/2006 | Shi et al. | 707/203 |
| 7,035,944 B2 | 4/2006 | Fletcher et al. | |
| 7,047,522 B1 | 5/2006 | Dixon et al. | |
| 7,051,316 B2 | 5/2006 | Charisius et al. | |
| 7,054,910 B1* | 5/2006 | Nordin et al. | 709/208 |
| 7,062,490 B2 | 6/2006 | Adya et al. | |
| 7,080,000 B1 | 7/2006 | Cambridge | |
| 7,089,584 B1 | 8/2006 | Sharma | |
| 7,174,563 B1 | 2/2007 | Brownlie et al. | |
| 7,181,731 B2* | 2/2007 | Pace et al. | 717/136 |
| 2001/0009016 A1 | 7/2001 | Hofmann et al. | |
| 2001/0034771 A1 | 10/2001 | Hutsch et al. | |
| 2001/0039586 A1* | 11/2001 | Primak et al. | 709/228 |
| 2002/0029296 A1 | 3/2002 | Anuff et al. | |
| 2002/0059394 A1 | 5/2002 | Sanders | |
| 2002/0062451 A1 | 5/2002 | Scheidt et al. | |
| 2002/0069261 A1 | 6/2002 | Bellare et al. | |
| 2002/0087571 A1 | 7/2002 | Stapel et al. | |
| 2002/0107920 A1* | 8/2002 | Hotti | 709/204 |
| 2002/0111998 A1 | 8/2002 | Kim | |
| 2002/0120685 A1 | 8/2002 | Srivastava et al. | |
| 2002/0124053 A1 | 9/2002 | Adams et al. | |
| 2002/0135617 A1 | 9/2002 | Samid | |
| 2002/0143819 A1 | 10/2002 | Han et al. | |
| 2002/0152279 A1 | 10/2002 | Sollenberger et al. | |
| 2002/0169893 A1* | 11/2002 | Chen et al. | 709/248 |
| 2002/0173971 A1 | 11/2002 | Stirpe et al. | |
| 2002/0178119 A1 | 11/2002 | Griffin et al. | |
| 2002/0188869 A1 | 12/2002 | Patrick | |
| 2003/0065721 A1 | 4/2003 | Roskind | |
| 2003/0069874 A1* | 4/2003 | Hertzog et al. | 707/1 |
| 2003/0078959 A1* | 4/2003 | Yeung et al. | 709/201 |
| 2003/0078972 A1 | 4/2003 | Tapissier et al. | |
| 2003/0088617 A1 | 5/2003 | Clark et al. | |
| 2003/0120686 A1 | 6/2003 | Kim et al. | |
| 2003/0131113 A1 | 7/2003 | Reeves et al. | |
| 2003/0140308 A1 | 7/2003 | Murthy et al. | |
| 2003/0146937 A1* | 8/2003 | Lee | 345/781 |
| 2003/0167455 A1 | 9/2003 | Iborra et al. | |
| 2003/0187956 A1 | 10/2003 | Belt et al. | |
| 2003/0204481 A1 | 10/2003 | Lau | |
| 2003/0216938 A1 | 11/2003 | Shour | |
| 2003/0229623 A1 | 12/2003 | Chang et al. | |
| 2004/0019650 A1 | 1/2004 | Auvenshine | |
| 2004/0024812 A1 | 2/2004 | Park et al. | |
| 2004/0205473 A1 | 10/2004 | Fisher et al. | |
| 2004/0205557 A1 | 10/2004 | Bahrs et al. | |
| 2004/0230546 A1 | 11/2004 | Rogers | |
| 2005/0050184 A1 | 3/2005 | Boden et al. | |
| 2005/0060324 A1 | 3/2005 | Johnson et al. | |
| 2005/0198617 A1 | 9/2005 | Kim et al. | |
| 2006/0059107 A1 | 3/2006 | Elmore et al. | |
| 2006/0085412 A1 | 4/2006 | Johnson et al. | |

FOREIGN PATENT DOCUMENTS

| | | |
|---|---|---|
| WO | WO 00/38078 | 6/2000 |
| WO | WO 01/14962 | 3/2001 |
| WO | WO 01/67285 | 9/2001 |
| WO | WO 01/77823 A1 | 10/2001 |
| WO | WO 02/063496 | 8/2002 |

OTHER PUBLICATIONS

"J2EE Enterprise Java Beans Technology"; http://java.sun.com/products/ejb; 2 pages (last visit: Dec. 7, 2004).

"To EJB, or not to EJB"; http://www.javaworld.com/javaworld/jw-12-2001/jw-1207-yesnoejb_p.html (last visit: Dec. 7, 2004.

Sundsted, Todd, JNDI Overview, Part 1: "An Introduction to Naming Services"; JavaWorld; Jan. 2000, pp. 1-6; downloaded from: www/javaworld.com/javaworld/jw-01-howto_p.html).

Moore, Bill, et al.; "Migrating Weblogic Applications to WebSphere Advanced Edition"; IBM Redbooks, Jan. 2001; pp. 1.3-1.4, 109-111 and 181-195.

Barrett, Alexandra; "Trying Out Transactions"; SunExpert Magazine, Jan. 1999; pp. 57-59.

Ayers, Danny, et al.; Professional Java Server Programming, Wrox Press, Ltd., Birmingham, UK. Dec. 1999, pp. 515-545.

Ford, Nigle; Web Developer.com Guide to Building Intelligent Web Sites with JavaScript, Wiley Computer Publishing, New York, NY; © 1998, pp. 65-86, 101-102, 245-250 and 324-327.

Microsoft Computer Dictionary, 4th Edition, Microsoft Press, Redmond, WA © 1999, p. 489.

U.S. Appl. No. 10/279,449, filed Oct. 24, 2002, Griffin
U.S. Appl. No. 10/279,542, filed Oct. 24, 2002, Cook et al.
U.S. Appl. No. 10/279,543, filed Oct. 24, 2002, Griffin et al.
U.S. Appl. No. 10/279,564, filed Oct. 24, 2002, Griffin et al.
U.S. Appl. No. 10/279,663, filed Oct. 24, 2002, Haut et al.
U.S. Appl. No. 10/279,696, filed Oct. 24, 2002, Qian et al.
U.S. Appl. No. 10/279,951, filed Oct. 24, 2002, Jolley et al.

Moran, D., et al., "Multimodal User Interfaces in the Open Agent Architecture," ACM 1997, pp. 61-68.

Rouff, C., "Formal Specification of User Interfaces," SIGCHI Bulletin, Jul. 1996, vol. 17, No. 3, pp. 27-33.

International Search Report, PCT/US04/04078, Dec. 15, 2005, 3 sheets.

International Search Report, PCT/US04/04140, Dec. 27, 2005, 3 sheets.

USDataCenters Chooses Baltimore SelectAccess to Enable Next Generation Security Solutions for eBusiness, Business Wire, Apr. 4, 2001.

Catley, Christina, et al., "Design of a Health Care Architecture for Medical Data Interoperability and Application Integration", Proceedings of the Second Joint EMBS/BMES Conference, Houston, TX, USA, Oct. 23-26, 2002, IEEE, vol. 3, pp. 1952-1953 (2002).

Candan, K.S., et al., "Enabling Dynamic Content Caching for Database-Driven Web Sites", Proceedings of the 2001 ACM SIGMOD International Conference on Management of Data, Santa Barbara, California, USA, May 21-24, 2001, pp. 532-543 (2001).

Browne, et al., "Location-Independent Naming for Virtual Distributed Software Repositories", http://portal.acm.org/dl.cfm, ACM Symposium on Software Reusability, Seattle, WA, US, Aug. 1995, vol. 20, Issue SI, pp. 179-185.

Howes, T., "The String Representation of LDAP Search Filters", ftp://ftp.rfc-editor.org/in-notees/rfc2254.txt, The Internet Society, RFC 2254, 8 pages (Dec. 1997).

Atkins, D.L., et al., "Mawl: A Domain-Specific Language for Form-Based Services", IEEE Transactions on Software Engineering, IEEE Service Center, Los Alamitos, CA, US, vol. 25, No. 3, pp. 334-346 (May 1999).

Cingil, Ibrahim, et al., "A Broader Approach to Personalization", Communications of the ACM, vol. 43, No. 6, pp. 136-141 (Aug. 2000).

Kistler, T., et al., "WebL—a programming language for the Web", Computer Networks and ISDN Systems, North Holland Publishing, Amsterdam, NL, vol. 30, No. 1-7, pp. 259-270 (Apr. 1998).

Levy, M.R., "Web Programming in Guide", Software Practice & Experience, Wiley & Sons, Bognor Regis, GB, vol. 28, No. 15, pp.1581-1603 (Dec. 25, 1998).

Stephanidis, Constantine, et al., "Decision Making in Intelligent User Interfaces", IUI '97, ACM Orlando, FL, pp. 195-202 (1997).

Stiemerling, Oliver, et al., "How to Make Software Softer—Designing Tailorable Applications", DIS '97, ACM Amsterdam, The Netherlands, pp. 365-376 (1997).

Symborski, Carl W., "Updating Software and Configuration Data in a Distributed Communications Network"; IEEE Computer Networking Symposium, Washington, D.C., USA, pp. 331-338 (Apr. 11-13, 1988).

Freudenthal, et al., "dRBAC: Distributed Role-Based Access Control for Dynamic Coalition Environments", Proceedings of the 22nd International Conference on Distributed Computing Systems (ICDCS '02), IEEE 2002, 10 pages.

Supplementary European Search Report for EP 02723874.0 dated Jun. 7, 2006, 3 pages.

Supplementary European Search Report for EP 02773915.0 dated Oct. 12, 2006, 3 pages.

Supplementary European Search Report for EP 01975484.5 dated Dec. 19, 2006, 2 pages.

Adya, Atul, et al., "Farsite: Federated, Available and Reliable Storage for an Incompletely Trusted Environment", ACM SIGOPS Operating Systems Review, vol. 36, Issue SI, OSDI '02: Proceedings of the 5th Symposium on Operating Systems Design and Implementation, pp. 1-14 (Winter 2002).

Zhang, Zheng, et al., "Designing a Robust Namespace for Distributed File Services", Reliable Distributed Systems, Proceedings 20th IEEE Symposium on Oct. 28-31, 2001, pp. 162-171 (2001).

Tanyi, Emmanuel, Easy XML, Mar. 6, 2000, www.winsite.com, pp. 1-6.

IBM TDB, "Method and System for Visually Constructing Document Type Definitions and Related Artifacts Using a Reusable Object Model", IBM Technical Disclosure Bulletin, IP.com, Inc., May 23, 2001, 3 pages.

"USDataCenters Chooses Baltimore SelectAccess to Enable Next Generation Security Solutions for eBusiness", Business Wire, Apr. 4, 2001, pp. 1-2.

Parker, Elisabeth, "Microsoft FrontPage 2000", 1999, QUE, pp. 7, 52, and 55.

* cited by examiner

DATA SYNCHRONIZATION

CLAIM OF PRIORITY

This present application claims the benefit of the filing date of U.S. Provisional Patent Application No. 60/386,487, filed Oct. 24, 2001, incorporated by reference herein in its entirety.

CROSS REFERENCE TO RELATED APPLICATIONS

SYSTEM AND METHOD FOR PORTAL PAGE LAYOUT, U.S. application Ser. No. 10/279,663, Inventors: John Haut, et al., filed on Oct. 24, 2002. SYSTEM AND METHOD FOR DELEGATED ADMINISTRATION, U.S. application Ser. No. 10/279,543, Inventors: Philip B. Griffin, et al., filed on Oct. 24, 2002; SYSTEM AND METHOD FOR RULE-BASED ENTITLEMENTS, U.S. application Ser. No. 10/279,564, Inventors: Philip B. Griffin, et al., filed on Oct. 24, 2002. SYSTEM AND METHOD FOR APPLICATION FLOW INTEGRATION IN A PORTAL FRAMEWORK, U.S. application Ser. No. 10/279,951, Inventors: Chris Jolley, et al., filed on Oct. 24, 2002. SYSTEM AND METHOD FOR PORTAL RENDERING, U.S. application Ser. No. 10/279,696, Inventors: Shelly Qian, et al., filed on Oct. 24, 2002. SYSTEM AND METHOD FOR XML DATA REPRESENTATION OF PORTLETS, U.S. application Ser. No. 10/279,449, Inventor: Philip B. Griffin, filed on Oct. 24, 2002. PORTAL ADMINISTRATION TOOL, U.S. application Ser. No. 10/279,542, Inventors: Thomas A. Cook, et al., filed on Oct. 24, 2002. SYSTEM AND METHOD FOR SERVER SECURITY AND ENTITLEMENT PROCESSING, U.S. application Ser. No. 09/878,536, Inventor: Paul Patrick, filed on Jun. 11, 2001.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to technology for deploying and synchronizing data.

2. Description of the Related Art

Web-based software applications have emerged as powerful tools which provide valuable services to vendors and customers alike. E-business web applications can be configured to operate in accordance with business logic to implement a variety of processes which facilitate electronic commerce. Such applications may also provide services which interact with remote Internet clients and/or applications.

The JAVA™ 2 Platform Enterprise Edition (J2EE), available from Sun Microsystems, Inc. of Santa Clara, Calif., facilitates the development of electronic business web applications that run within the context of multi-tier enterprise applications. The operation of such web applications is governed by the data ("application data") used to configure the web applications. As a result, the functionality provided by web applications can be modified by updating the application data associated with the applications.

Unfortunately, the deployment and synchronization of new or updated application data to J2EE web applications can be a cumbersome process. Newly-authored application data is often stored in a database in accordance with a particular schema used by the database. If a developer seeks to deploy such application data to a running production server, the data must be extracted from the database before being converted into a form suitable for transmission to the server. Scripts are often necessary to export the application data from a database into a file system. Scripts may also be necessary to import the application data to a running server. For these reasons, maintaining different versions of application data can also be an awkward and unwieldy endeavor.

Moreover, before new application data can be moved to a running production server, it may be necessary to deploy the application data to multiple servers to comply with a multi-stage testing process. This transfer of application data can be a cumbersome manual process which becomes increasingly error-prone as application data is transferred from server to server and more persons are involved. Thus, prior techniques of deploying and synchronizing application data in the context of the J2EE platform can be largely ad-hoc and undesirable.

SUMMARY OF THE INVENTION

The present invention, roughly described, is directed to synchronizing application data used by enterprise applications running on one or more servers. For example, in one embodiment, application data is received and synchronized with a database and data repository. In another embodiment, an application data deployment method is provided allowing application data to be authored, submitted to a source control system, and sent to a remote server where a data repository of the server is synchronized with the data.

In another embodiment, application data is synchronized between enterprise applications through the use of proxy data repositories. In another embodiment, application data is synchronized between data repositories through the polling of one data repository by another.

Systems and computer readable media are also provided for implementing portions of, and variations of, these methods. Many other embodiments are also possible, as set forth in the present disclosure.

DETAILED DESCRIPTION OF THE INVENTION

Figure 1:
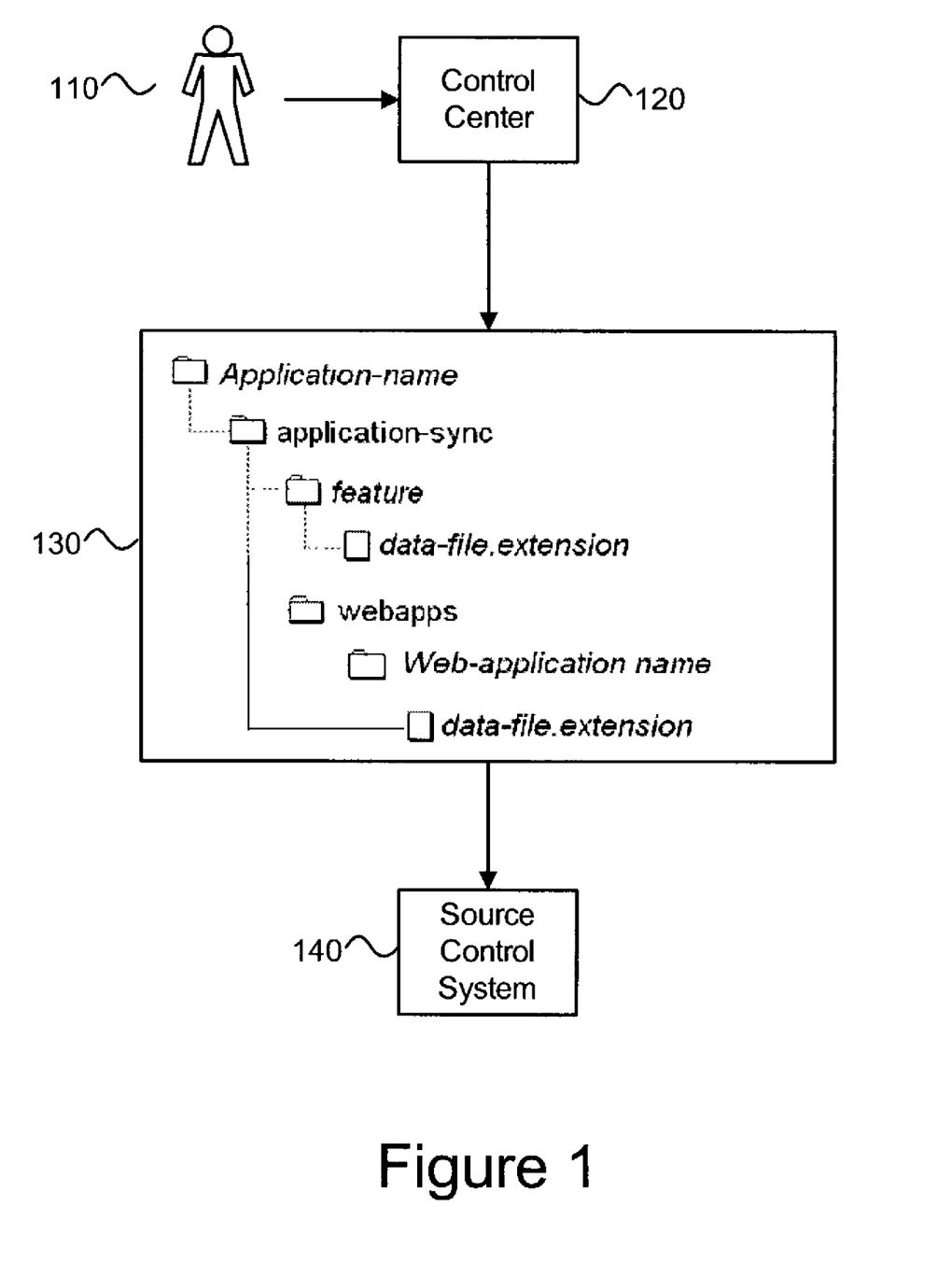
FIG. 1 illustrates a conceptual diagram of a system for creating and versioning application data files in accordance with an embodiment of the present invention.

FIG. 1 illustrates a conceptual diagram of a system for creating and versioning application data files in accordance with an embodiment of the present invention. Author 110 is a person with the responsibility of creating application data to be used by one or more web applications and/or services. In various embodiments, author 110 can be a line-of-business manager, business engineer, developer, or other person responsible for authoring application data. The application data can be used to configure a web application to operate in accordance with business logic identified by author 110. For example, application data created by author 110 can include business policy documents such as campaign definitions, scenarios, business rule sets, portal definitions, and/or other types of data used by web applications.

In order to produce the application data, author 110 can interface with various software tools, such as control center 120. In one embodiment, control center 120 is an E-Business Control Center tool available from BEA Systems, Inc. of San Jose, Calif. The data created by author 110 using control center 120 can be stored in a local hierarchical file system as a set of application data files. FIG. 1 illustrates an example of application data files 130 stored in a hierarchical file system. The application data files 130 can be organized according to the web application they are created for. In one embodiment, the application data created with control center 120 is stored in XML files in accordance with an XML schema which can be interpreted by the web application for which the data is authored. Since XML can be read and interpreted by various systems across multiple platforms, the use of XML application data provides advantages over database scripting-oriented approaches.

Application data files 130 produced by the interaction of author 110 with control center 120 can be checked into source control system 140. Source control system 140 allows different versions of the application data files 130 to be easily recalled for testing, deployment, synchronization, and/or other purposes. For example, if faulty application data is deployed to a web application, the source control system 140 allows author 110 to recall a previous version of the application data and re-deploy the data to the web application. The use of source control system 140 can also prevent multiple authors from overwriting each other's files when application data is being authored concurrently. In one embodiment, source control system 140 is any suitable source control system known in the art.

After application data has been created, it will typically be subject to a multi-stage approval process to test the interaction of the newly-authored application data with other data and/or applications created by other authors. For example, before application data is deployed to a production server, it may be subject to separate development and quality assurance stages. These stages help ensure that the web applications running on live production servers will operate reliably.

During this collaborative development of web applications, it can become desirable for software developers to synchronize application data across enterprise application boundaries to remote servers. Various data synchronization processes further described herein leverage the advantages provided by HTTP to facilitate the synchronization of application data on remote servers accessible via the Internet. In accordance with certain embodiments of the present invention, newly-created application data can be synchronized with one or more remote running servers. By identifying the URL associated with a server, application data can be remotely synchronized to any server accessible over the Internet via HTTP.

Figure 2:
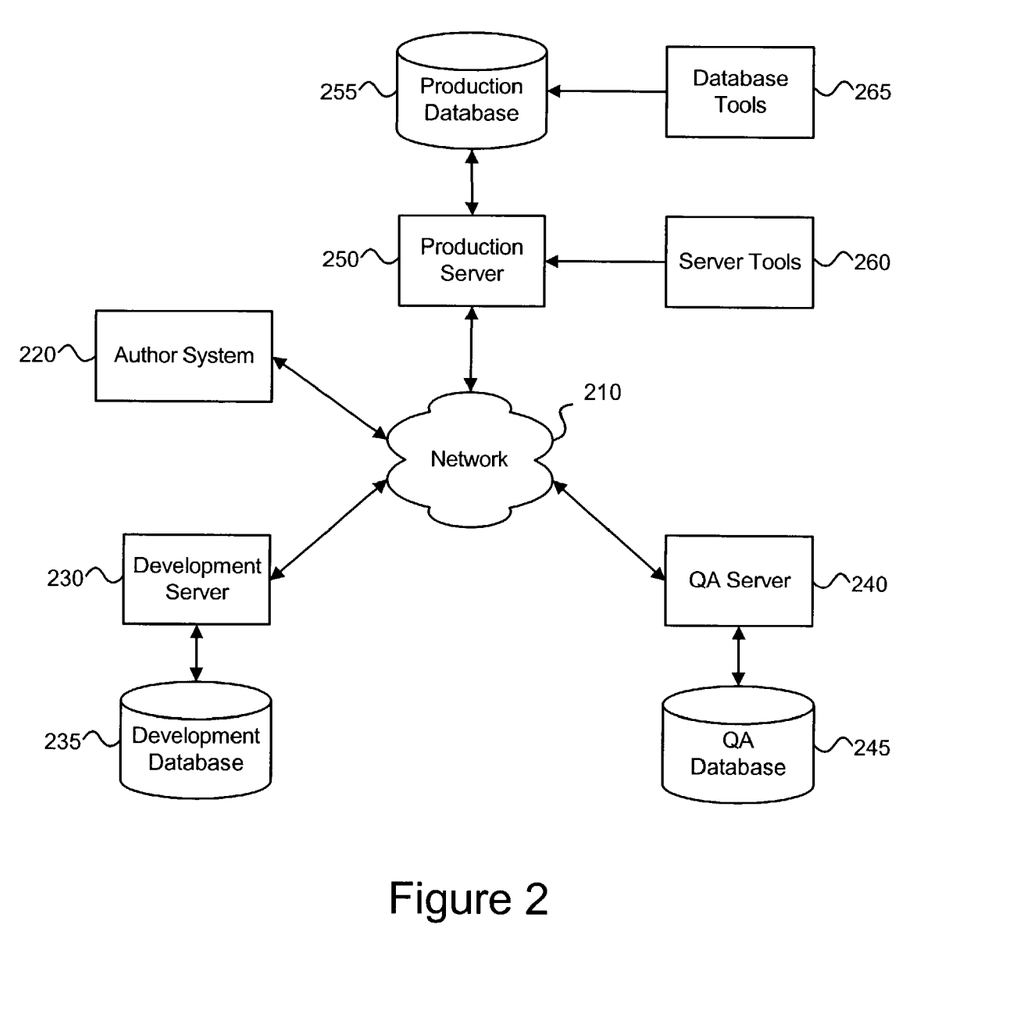
FIG. 2 illustrates a high level block diagram of a system for synchronizing data in accordance with an embodiment of the present invention.

FIG. 2 illustrates a high level block diagram of a system for synchronizing data in accordance with an embodiment of the present invention. The system of FIG. 2 can be used for collaboratively developing and testing web applications before they are ultimately deployed on a production server. In one embodiment, the system of FIG. 2 is implemented using one or more components of BEA WebLogic Platform™, available from BEA Systems, Inc. of San Jose, Calif. As illustrated in FIG. 2, a plurality of servers are in communication with network 210. In one embodiment, the system of FIG. 2 is implemented as a peer-to-peer network. Each server of FIG. 2 is associated with a database which can store application data used by web applications and/or services running on the server. As indicated by FIG. 2, each server can be used for a different purpose in a multi-stage application data approval process. For example, these purposes can include: development (server 230 and database 235), quality assurance (server 240 and database 245), production (server 250 and database 255), and others (not shown).

Each server of FIG. 2 is capable of receiving application data from author system 220 over network 210. The application data received from author system 220 can be synchronized with application data used by web applications running on the various servers as further described herein. In one embodiment, author system 220 is the system illustrated in FIG. 1.

Server tools 260 and database tools 265 are also illustrated in FIG. 2. These tools allow for the realtime modification of data on production server 250 and production database 255, respectively. In one embodiment, server tools 260 are JSP-based tools which allow changes to be made directly to production server 250.

Figure 3:
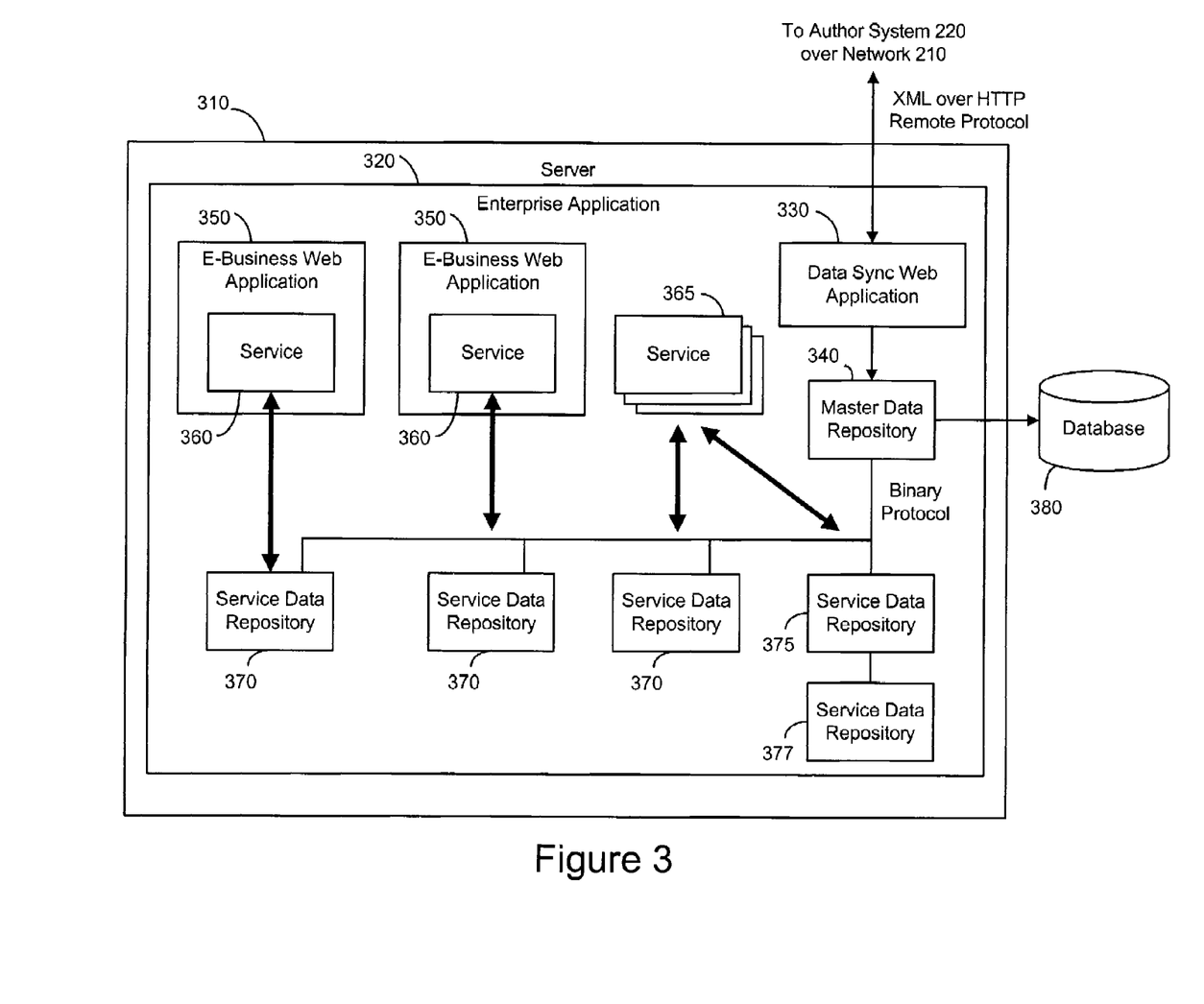
FIG. 3 illustrates a block diagram of a server running an enterprise application having data that can be synchronized in accordance with an embodiment of the present invention.

FIG. 3 illustrates a block diagram of a server running an enterprise application having data that can be synchronized in accordance with an embodiment of the present invention. Server 310 can be any of the servers illustrated in FIG. 2 capable of receiving application data from author system 220. As illustrated in FIG. 3, a plurality of web applications and services reside in enterprise application 320 running on server 310. E-business web applications 350 include services 360 that rely upon application data stored in service data repositories 370, 375, and/or 377. Additional services 365 running within the context of enterprise application 320 can also rely upon application data stored in the service data repositories. In one embodiment, the service data repositories are Java objects that function as in-memory caches of data items of interest to a deployed class of service.

Data sync web application 330 also runs within enterprise application 320 and is responsible for performing data synchronization operations in accordance with the present invention. As indicated by FIG. 3, data sync application 330 can communicate with author system 220 of FIG. 2 over network 210. A master data repository 340 within enterprise application 320 can communicate with data sync application 330, database 380, and data repositories 370 and 375.

Data sync application 330 can intercept incoming synchronization requests sent from author system 220 over network 210. In one embodiment, these synchronization requests are sent as XML over HTTP in accordance with a remote protocol. When data sync application 330 receives a synchronization request from author system 220, it channels application data received from author system 220 to master data repository 340 which is a runtime representation of the application data. The data sync application 330 also channels the application data received to database 380 which is a persistent storage location for the application data. In one embodiment, data repository 340 stores incoming application data as Enterprise Java Beans (EJBs). In another embodiment, database 380 is a relational database management system.

In one embodiment, data sync application 330 includes a set of JSPs that are capable of reporting: the contents of master data repository 340, data repositories that are successfully synchronized with master data repository 340, and the contents of each data repository in enterprise application 320.

The service data repositories of FIG. 3 each contain subsets of the application data stored in master data repository 340. Services 360 and 365 use the data in the service data repositories to carry out business tasks. For example, a rules service can use the data to evaluate whether customers fit into a particular customer segment. Since the service data repositories of FIG. 3 maintain only a subset of the data in master data repository 340, each service is able to parse a small, specific set of application data needed by the service without having to maintain copies of all application data maintained in master data repository 340.

Each time the master data repository 340 is synchronized, it notifies data repositories 370 and 375. These data repositories then synchronize their data subsets with the data in the master. In one embodiment, application data is communicated between the components of enterprise application 320 in accordance with a binary protocol. Multiple enterprise applications (not shown) running on server 310 can also be synchronized using a separate data sync application running in each enterprise application. Proxy data repositories can be used to facilitate such synchronizations.

In some cases, the master data repository 340 does not directly synchronize data with a data repository. Rather, a notification chain can be employed using multiple data repositories. Referring to FIG. 3, data repositories 375 and 377 form a notification chain. When data repository 375 receives updated application data from master data repository 340, it notifies data repository 377. Data repository 377 can then be synchronized with the application data received by data repository 375. As a result, both repositories 375 and 377 can be synchronized without master data repository 340 having to send updated application data to both repositories.

Figure 4:
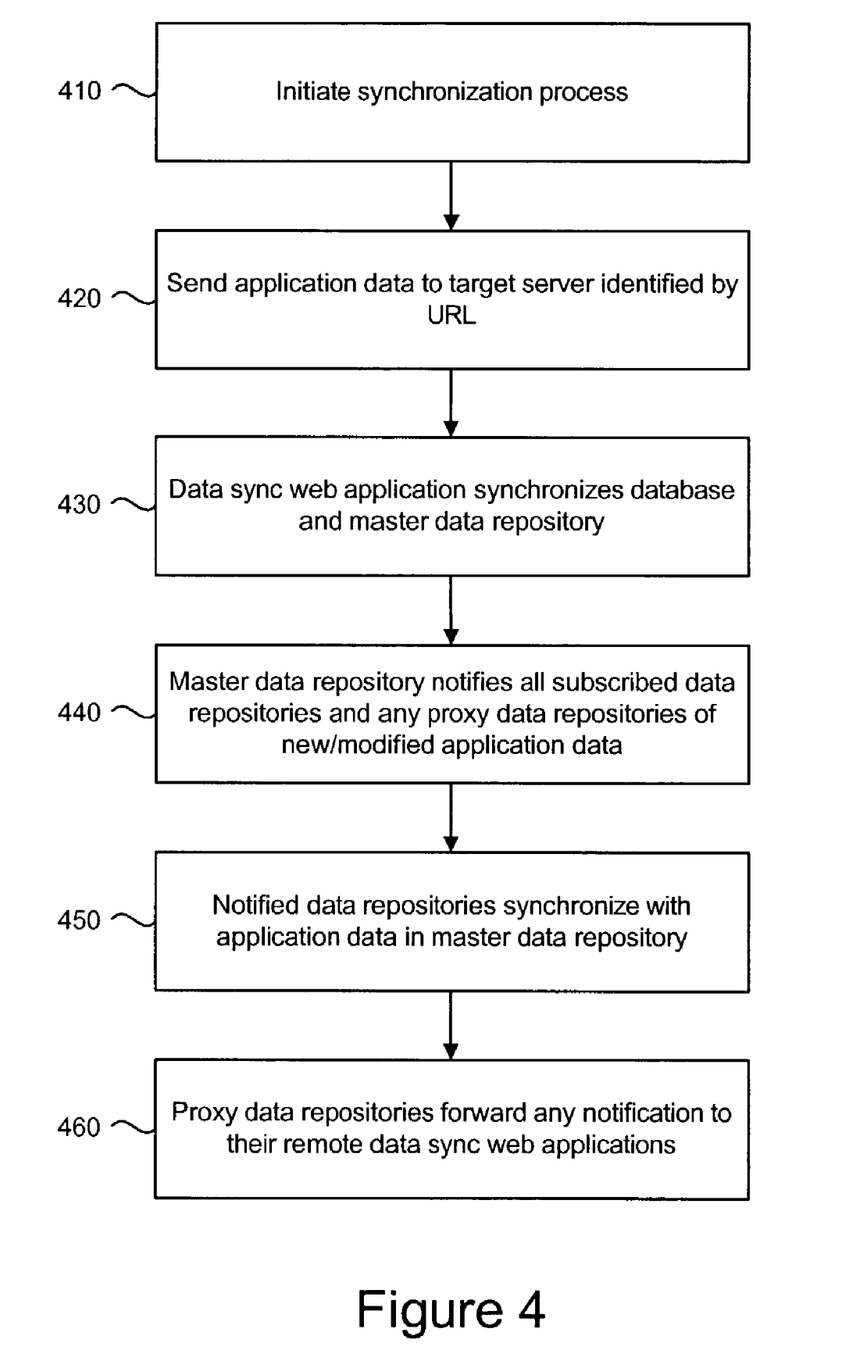
FIG. 4 is a flowchart illustrating a process for synchronizing data in accordance with an embodiment of the present invention.

FIG. 4 is a flowchart illustrating a process for synchronizing data in accordance with an embodiment of the present invention. When application data is to be synchronized from author system 220 to any of the servers of FIG. 2, a synchronization process can be initiated (step 410) by sending a synchronization request from author system 220 to the URL of the server to be synchronized where it will be intercepted by data sync application 330. In various embodiments, author 110 can initiate the synchronization process using a graphical interface of control center 120 or a Java command line.

In various embodiments of the present invention, different synchronization modes can be employed. In a refresh-from-client mode, all application data for a given application is synchronized. Using this mode, all data is cleared from the data repositories and then all relevant application data files are sent from the author's local file system to a data sync web application. This mode can be helpful to synchronize in-memory data with persisted data, or to recover from a synchronization error. In a one-way-from-client mode, only those application data files that have been removed, updated, or created on the author's local file are updated. Thus, the amount of data transmitted between an author system and a server to be synchronized can be minimized.

Upon initiation of the synchronization process in step 410, application data to be synchronized will be sent from author system 220 to server 310 over network 210 (step 420). In one embodiment, the application data is sent as XML files over HTTP using a POST command. The application data is received by data sync application 330. Data sync application 330 then synchronizes database 380 and master data repository 340 with the newly-received application data (step 430). As a result of step 430, database 380 contains the updated application data stored in a database format for persistent storage, and master data repository 340 contains the updated application data stored in an EJB runtime format.

As previously described herein, the various applications and services of FIG. 3 may rely upon application data resident in service data repositories. Accordingly, each of the service data repositories can subscribe to receive updated application data. In order to update the application data in data repositories 370 and 375, master data repository 340 notifies each of service data repositories 370 and 375 of any updated application data for which the repositories have subscribed to receive (step 440). Service data repository 377 receives its notification via a notification chain, as previously described. Master data repository 340 also notifies proxy data repositories (not shown) for enterprise applications running on other servers, as further described herein. After the service data repositories have been notified of the updated application data, each repository synchronizes itself with the particular application data in master data repository 340 to which it subscribes (step 450). Proxy data repositories also forward any notifications sent in step 440 to their remote data sync web applications in order to synchronize repositories running in other enterprise applications (not shown) on server 310 or other remote servers (step 460), as further described herein.

Service data repositories 370 and/or 375 can also poll master data repository 340 periodically to check whether application data has been updated. If updated data is detected, then application data maintained in master data repository 340 can be synchronized with service data repositories 370 and/or 375.

Master data repository 340 maintains a log that describes each update and includes a description of which data repositories were successfully updated, and which were not. Data sync application 330 can return a status message to author system 220 via HTTP or a Java command shell to identify which application data files were successfully synchronized. Each data repository of FIG. 3 can also maintain logs that describe its current contents.

As illustrated in FIG. 3, application data can be synchronized between an author system and an enterprise application running on a single server. In accordance with various embodiments of the present invention, multiple servers can also synchronized through a single synchronization process initiated in step 410 of FIG. 4. This synchronization of multiple servers can be facilitated through the use of additional elements as set forth in FIG. 5.

Figure 5:
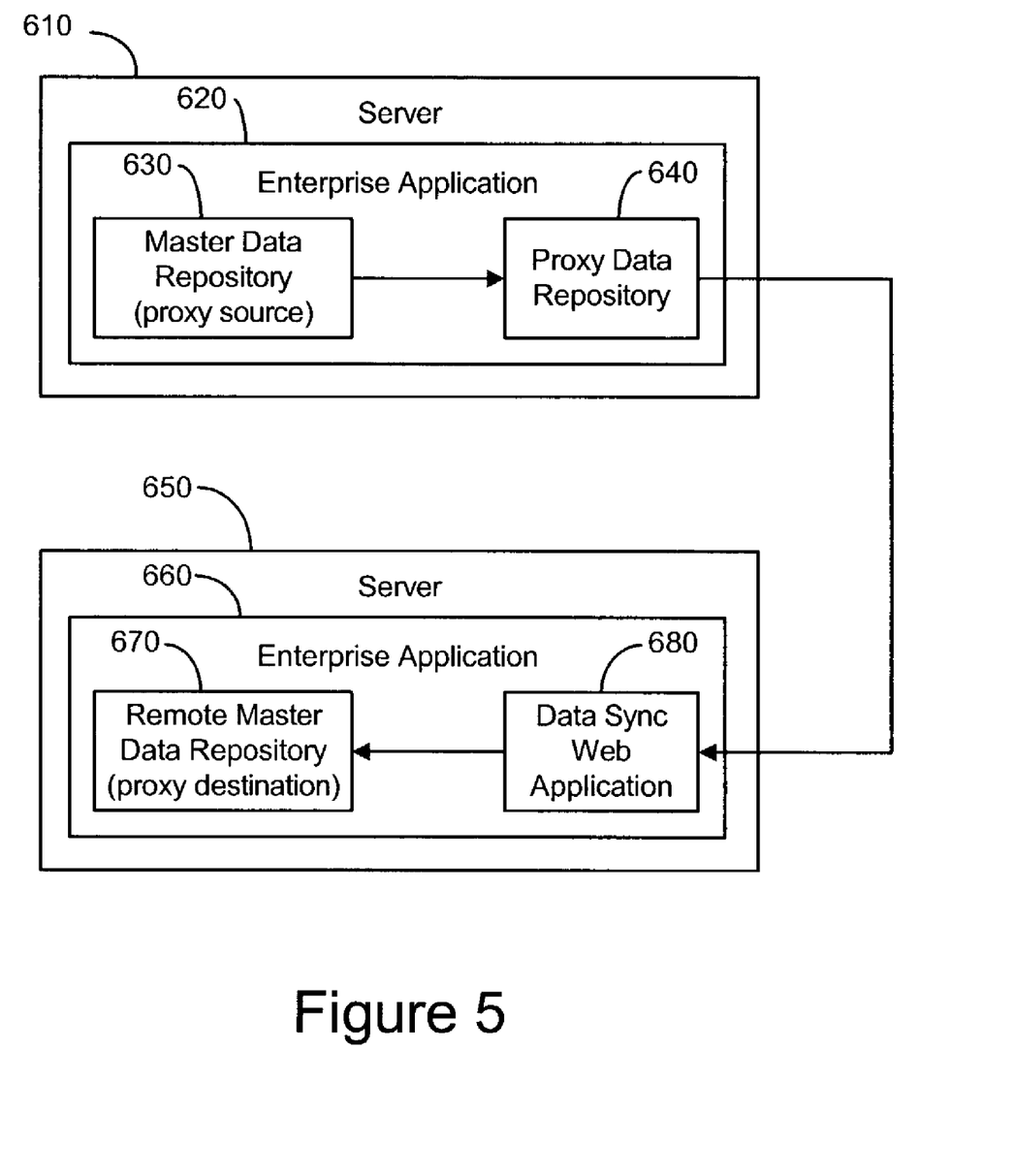
FIG. 5 illustrates a block diagram of multiple servers running enterprise applications with data that can be synchronized using a proxy data repository in accordance with an embodiment of the present invention.

FIG. 5 illustrates a block diagram of multiple servers running enterprise applications with data that can be synchronized using a proxy data repository in accordance with an embodiment of the present invention. Enterprise applications 620 and 660 are running on servers 610 and 650, respectively. A master data repository 630 running within enterprise application 620 can be synchronized by a data sync application (not shown) in communication with an author system (not shown) as previously described herein. Master data repository 630 is in communication with proxy data repository 640 also running within enterprise application 620. Proxy data repository 640 can subscribe to receive updated application data stored in master data repository 630.

Data sync web application 680 is an instance of a data sync application that runs on remote server 650. However, rather than receiving updates directly from an author system 220 (similar to data sync application 330 of FIG. 3), data sync application 680 receives updates sent from proxy data repository 640. Remote master data repository 670 is a master data repository for enterprise application 660 which is updated in accordance with application data received by data sync application 680. Remote master data repository 670 can pass updated application data to other proxy and/or service data repositories (not shown) running in enterprise application 660 as previously discussed herein. It will be understood that additional elements (not shown) can be present on the servers of FIG. 5, such as one or more of the elements set forth in the servers of FIG. 3 and/or FIG. 6.

In operation, master data repository 630 receives updated application data from a data sync web application in communication with an author system (not shown) such as author system 220 of FIG. 2. Proxy data repository 640 is subscribed to receive updated application data from master data repository 640. As a result, the updated application data received by master data repository 630 is passed to proxy data repository 640. Proxy data repository 640 then passes the application data from server 610 to the data sync application running on server 650. In one embodiment, application data is received by proxy data repository 640 in accordance with a binary protocol. Accordingly, proxy data repository 640 marshals the application data into an XML format before passing the application data as XML over HTTP to data sync application 680 in remote server 650.

When the updated application data is received by data sync application 680, the data sync application 650 proceeds to update remote master data repository 670 with the updated application data. A persistent storage database (not shown in FIG. 5) as illustrated in FIG. 3 is also synchronized, and the updated application data is then forwarded to all data repositories (not shown) of enterprise application 660 which are subscribed to receive the updated application data.

Thus, by subscribing proxy data repositories to receive updates from a master data repository, application data within enterprise applications running on remote servers can be synchronized with application data received by the master data repository. Proxies can also be used to synchronize data across different enterprise applications running on the same server. Moreover, by linking remote servers to additional remote servers through proxies, chains of multiple servers can be synchronized. These principles can be further applied to the synchronizing application data across clusters of servers as set forth in FIG. 6.

Figure 6:
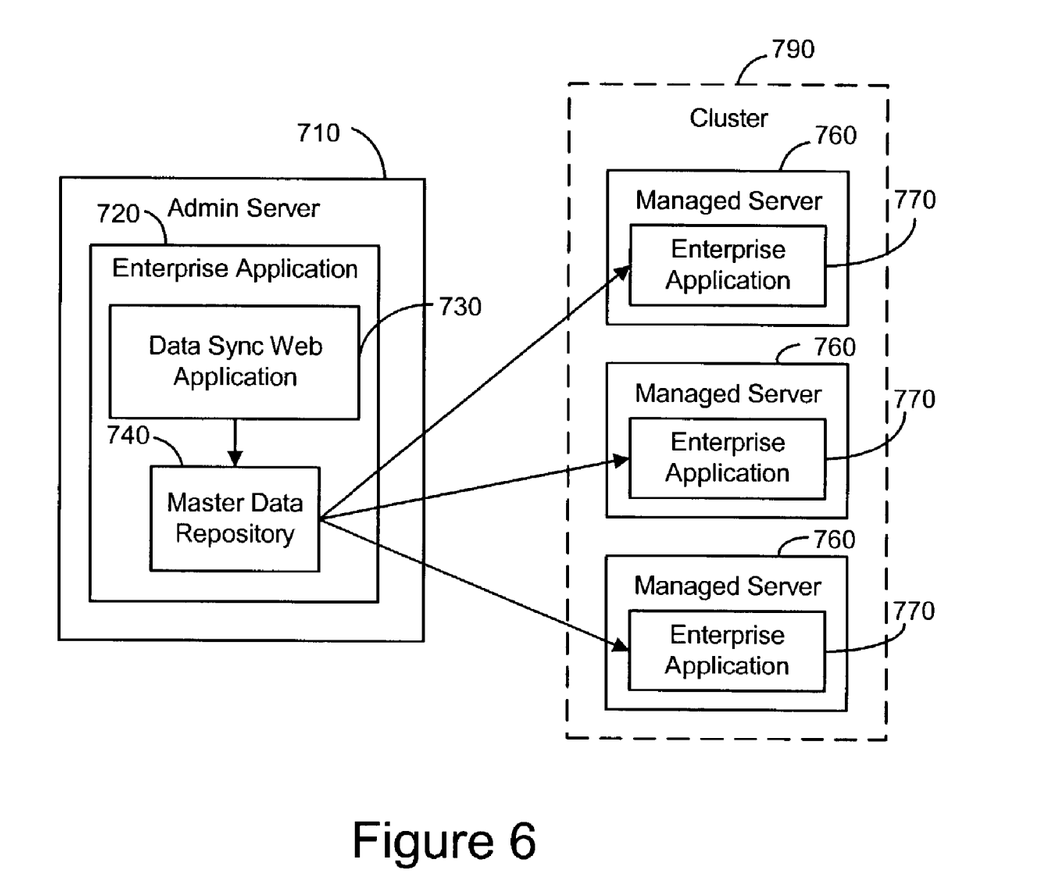
FIG. 6 illustrates a block diagram of a cluster of servers running enterprise applications with data that can be synchronized by an administration server in accordance with an embodiment of the present invention.

FIG. 6 illustrates a block diagram of a cluster of servers running enterprise applications with data that can be synchronized by an administration server in accordance with an embodiment of the present invention. Data sync web application 730 and master data repository 740 of enterprise application 720 on administration server 710 can communicate with managed servers 760 of cluster 790. As previously discussed, application data residing in data repositories (not shown) of enterprise applications 770 running on remote servers 760 can be synchronized with updated application data stored in master data repository 740. Master data repository 740 can pass updated application data to a proxy data repository (not shown) which then passes the data to data sync web applications (not shown) running on enterprise applications 770. As a result, multiple servers 760 can be synchronized by a single administration server 710 that receives updated application data from an author system (not shown). It will be understood that additional elements (not shown) can be present on the servers of FIG. 6, such as one or more of the elements set forth in the servers of FIG. 3 and/or FIG. 5.

Where applicable, the present invention can be implemented using hardware, software, or combinations of hardware and software. Software in accordance with the present invention, such as program code and/or data, can stored on one or more computer readable mediums. Also where applicable, the various hardware components and/or software components set forth herein can be combined into composite components comprising software, hardware, or both without departing from the spirit of the present invention. Similarly, where applicable, the various hardware components and/or software components set forth herein can be dissected into sub-components comprising software, hardware, or both without departing from the spirit of the present invention. In addition, where applicable, it is contemplated that software components can be implemented as hardware components, and vice-versa. Furthermore, where applicable, the various steps set forth herein can be combined into composite steps and/or dissected into sub-steps. It is also contemplated that software components set forth herein can be implemented using one or more general purpose or specific purpose computers and/or computer systems, networked and/or otherwise.

The foregoing disclosure is not intended to limit the present invention to the precise forms or particular fields of use disclosed. It is contemplated that various alternate embodiments and/or modifications to the present invention are possible in light of the disclosure.

What is claimed is:

1. A method for synchronizing application data, comprising:

receiving a synchronization request at a data synchronization web application, the data synchronization web application running on a web server;

sending new application data by the data synchronization web application to a master data repository on the web server in accordance with the synchronization request, wherein the master data repository is synchronized with the new application data;

communicating the new application data to a database by the master data repository;

notifying a first service data repository on the web server by the master data repository each time the master data repository is synchronized; and synchronizing data subsets in the first service data repository with data in the master data repository, said synchronizing being performed on the data subsets by the first service data repository separate from synchronizing performed on the new application data in the master data repository after being notified by the master data repository;

notifying a second service data repository on the web server using the first service data repository when the first service data repository has been synchronized with the new application data from the master data repository; and synchronizing data stored in the second service data repository with the new application data using the second service data repository separate from synchronizing performed on said new application data.

2. The method of claim 1, wherein: said data synchronization application runs within an enterprise application of said web server.

3. The method of claim 1, wherein: said web server is a development server.

4. The method of claim 1, wherein: said web server is a testing server.

5. The system method of claim 1, wherein: said web server is a production server.

6. The method of claim 1, wherein said application data comprises at least one XML file.

7. The method of claim 1, wherein said application data comprises application data files adapted for transmission over HTTP.

8. The method of claim 1, wherein the master data repository is a runtime representation of the application data.

9. The method of claim 1 wherein the data synchronization web application includes a set of Java Server Pages.

10. The method of claim 1, wherein the web server comprises a first web server, the method further comprising:

sending the new application data to a proxy data repository running on the first web server;

forwarding the new application data from the proxy data repository to a data synchronization web application running on a second server;

updating a master data repository in the second server with the new application data from the proxy data repository using the data synchronization web application on said second server;

notifying using the master data repository on the second server a service data repository in the second server of the new application data; and synchronizing data in the service data repository in the second server with the new application data using the service data repository in the second server separate from synchronizing performed on said new application data in the master data repository of the second server.

11. The method of claim 1, further comprising:

polling the master data repository by the first service data repository to determine if the master data repository has received additional new application data; and synchronizing data in the first service data repository with the additional new application data when polling indicates the master data repository has received the additional new application data.

12. The method of claim 1, further comprising: maintaining a log in the first service data repository indicating when the first service data repository has been synchronized with the new application data in said master data repository.

13. The method of claim 1, further comprising:

maintaining a log in the master data repository indicating when the first service data repository has been synchronized.

\* \* \* \* \*

UNITED STATES PATENT AND TRADEMARK OFFICE
CERTIFICATE OF CORRECTION

PATENT NO. : 7,451,163 B2
APPLICATION NO. : 10/279450
DATED : November 11, 2008
INVENTOR(S) : Selman et al.

It is certified that error appears in the above-identified patent and that said Letters Patent is hereby corrected as shown below:

In page 3, in column 2, line 9, delete "1.3-1.4," and insert -- 1.3-4, --, therefor.

In page 3, in column 2, lines 35-37, below "sheets." delete "USDataCenters Chooses Baltimore SelectAccess to Enable Next Generation Security Solutions for eBusiness, Business Wire, Apr. 4, 2001.".

Signed and Sealed this

Twentieth Day of April, 2010

David J. Kappos
*Director of the United States Patent and Trademark Office*